(12) United States Patent
Aikawa

(10) Patent No.: US 6,210,007 B1
(45) Date of Patent: Apr. 3, 2001

(54) STEREOMICROSCOPE HAVING A CLOSING MEMBER FOR PROTECTING LENSES

(75) Inventor: Yasuyuki Aikawa, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/499,463

(22) Filed: Feb. 7, 2000

(30) Foreign Application Priority Data

Feb. 8, 1999 (JP) .................................................. 11-030061
Dec. 24, 1999 (JP) .................................................. 11-366939

(51) Int. Cl.$^7$ .............................. G02B 7/00; G03B 11/04
(52) U.S. Cl. ........................... 359/511; 359/368; 359/507
(58) Field of Search .................................... 359/368–384, 359/507–512, 600, 610–612; 396/348, 448, 535, 544

(56) References Cited

U.S. PATENT DOCUMENTS

| | | | |
|---|---|---|---|
| 4,019,192 | * 4/1977 | Miyagawa | ............................ 359/511 |
| 4,295,706 | 10/1981 | Frost | ..................................... 359/511 |
| 5,784,195 | 7/1998 | Mac Collum | ........................ 359/511 |
| 5,841,576 | 11/1998 | Aikawa | ................................. 359/358 |

OTHER PUBLICATIONS

English Abstract of the Japanese application, Serial No. 5-314941, Nov. 1993.

* cited by examiner

Primary Examiner—Thong Nguyen
(74) Attorney, Agent, or Firm—Morgan, Lewis & Bockius LLP

(57) ABSTRACT

A stereomicroscope having a closing member for protecting lenses. The stereomicroscope comprises a microscope unit having a microscope body that holds eyepiece lens groups and objective lens groups, a base for supporting the microscope unit, and a focusing unit that connects the microscope unit movably up and down to the base. The microscope body is provided with the closing member to close an opening for the objective lens groups.

4 Claims, 10 Drawing Sheets

STEREOMICROSCOPE HAVING A CLOSING MEMBER FOR PROTECTING LENSES

CROSS-REFERENCE TO RELATED APPLICATION

This application is based upon and claims priority of Japanese Patent Application No. 11-030061 filed on Feb. 8, 1999, the contents being incorporated herein by reference.

FIELD OF THE INVENTION

The present invention relates to a technique regarding a stereomicroscope for observing objects such as preparations. More specifically, the present invention relates to a technique for effectively protecting objective lens groups of the stereomicroscope when the stereomicroscope is carried or kept during unused time.

BACKGROUND ART

A stereomicroscope, generally, comprises a microscope unit including objective lens groups and eyepiece lens groups, a base on which an observing stage is placed, and a focusing unit for moving said microscope unit up and down in a direction perpendicular to the base. The stereomicroscope, recently, has a trend to be folded smaller in height during unused time, because it is easy to carry outdoors or to keep in a narrower space. Although the eyepiece lens groups, when such a stereomicroscope is used, are considerably protruded from the microscope body, the eyepiece lens groups, when the stereomicroscope is carried or kept, are moved towards the base by turning the microscope unit upside down around a shaft supported by the focusing unit. When the stereomicroscope is carried or kept during unused time, a dust cover made of material such as rubber is fitted to an opening of the microscope unit, or the stereomicroscope is kept in a protecting case that houses the entire stereomicroscope, because otherwise dust or rain could enter the microscope unit through the opening.

There is a problem that the dust cover or protecting case could be lost outdoors or anywhere, because the dust cover or protecting case is a separate thing from the stereomicroscope. When the stereomicroscope is carried without the dust cover, with the microscope unit being turned upside down, it is inevitable that dust or rain enter the stereomicroscope through the opening and clings to the surface of an objective lens. Furthermore, there is another problem. Even if the dust cover or protecting case is not lost, users tend to carry the stereomicroscope without covering the opening, because it is troublesome to fit the dust cover to the opening or to put the stereomicroscope into the protecting case.

Thus, there are needs for a stereomicroscope that is able to prohibit dust or rain from entering the stereomicroscope and clinging to the lenses.

SUMMARY OF THE INVENTION

An object of the present invention is to provide a stereomicroscope having a closing member to effectively protect objective lens groups when the stereomicroscope is carried or kept during unused time.

In order to achieve the above object, according to one aspect of the present invention, there is provided a stereomicroscope, comprising a microscope unit having a microscope body that holds eyepiece lens groups and objective lens groups; a base for supporting said microscope unit; a focusing unit that connects movably said microscope unit up and down to the base; wherein said microscope body is provided with a closing member to close an opening for said objective lens groups. In this invention, a user closes the opening with the closing member of the microscope body when he carries or keeps the stereomicroscope.

Furthermore, in accordance with a second aspect of the present invention, the focusing unit may connect the microscope unit to the base in a manner that the microscope unit is able to be turned upside down.

In accordance with a third aspect of the present invention, the closing member may be a sliding shutter that is slidably held to the stereoscope body.

In accordance with a fourth aspect of the present invention, the stereomicroscope may further comprise a drive device that opens and closes said closing member. The user closes or opens the opening by operating or actuating said drive device.

In accordance with a further aspect of the present invention, the drive device may operate in association with the upside down turning movement of the microscope unit.

BRIEF DESCRIPTION OF THE DRAWINGS

The present invention is described with reference to the drawings, in which.

DETAILED DESCRIPTION OF THE PREFERRED EMBODIMENTS

THE FIRST EMBODIMENT

Figure 1:
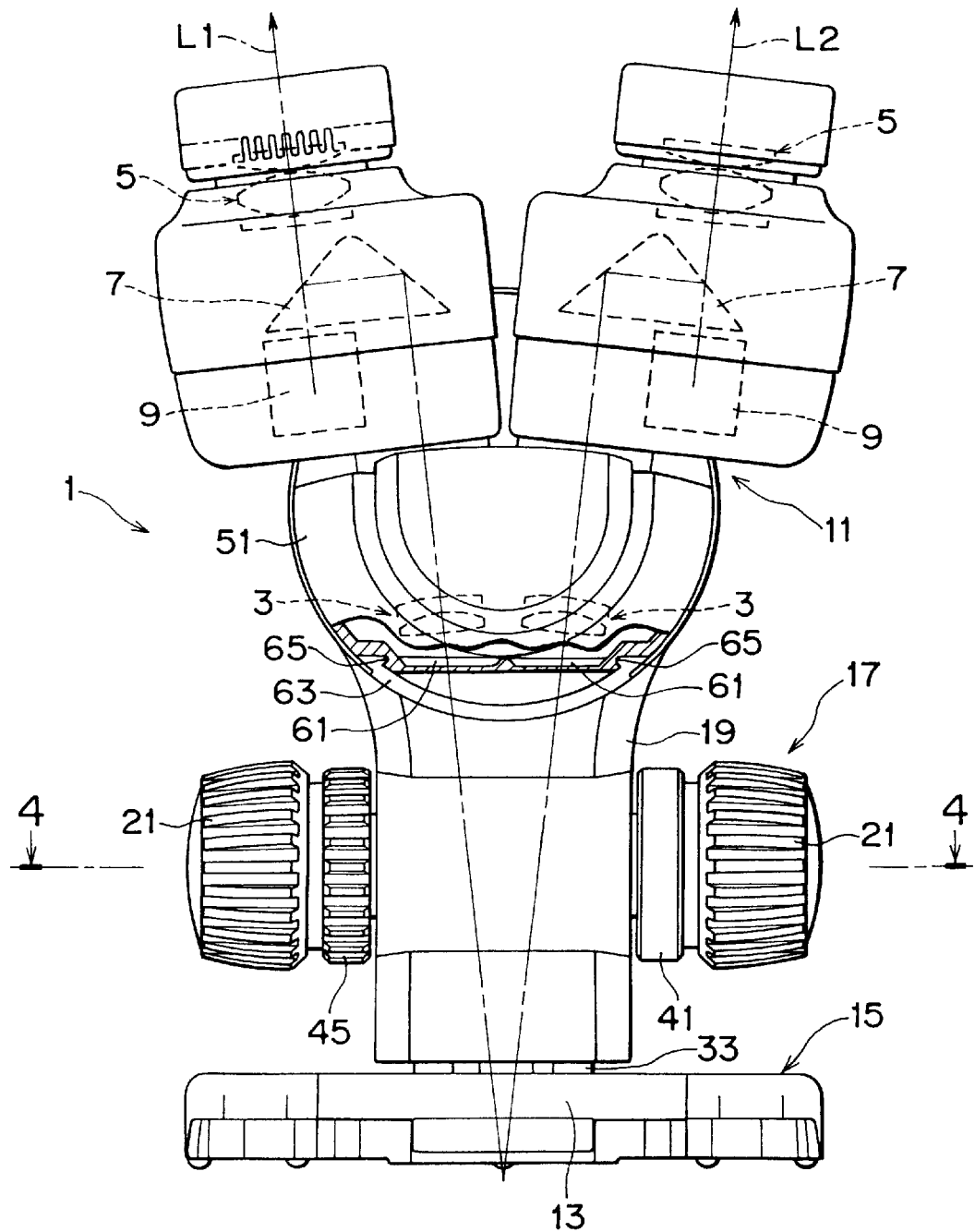
FIG. 1 is a front view of a stereomicroscope in an observing state in accordance with the first embodiment of the present invention.
Figure 2:
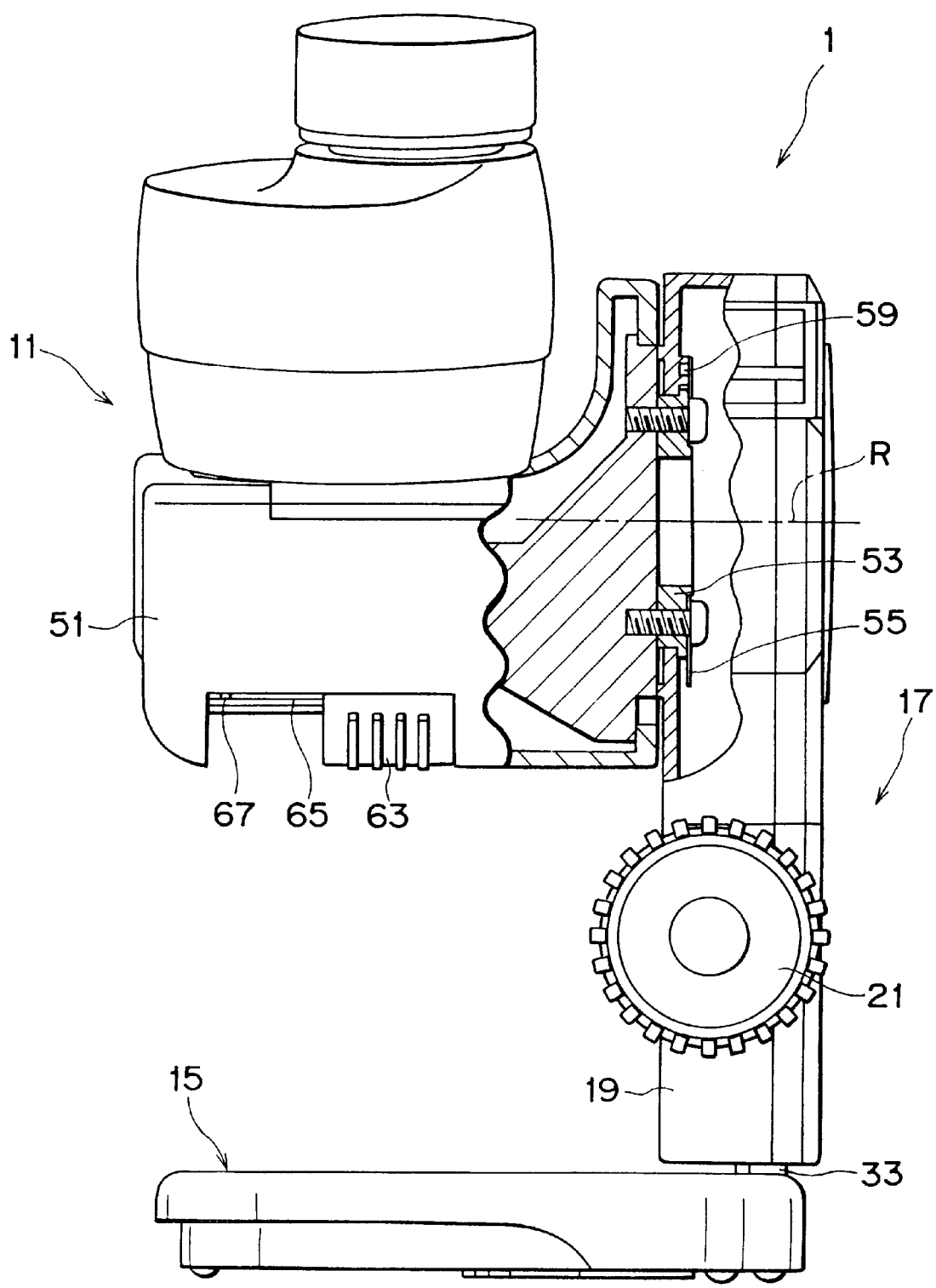
FIG. 2 is a side sectional view of the main part of the same stereomicroscope.
Figure 3:
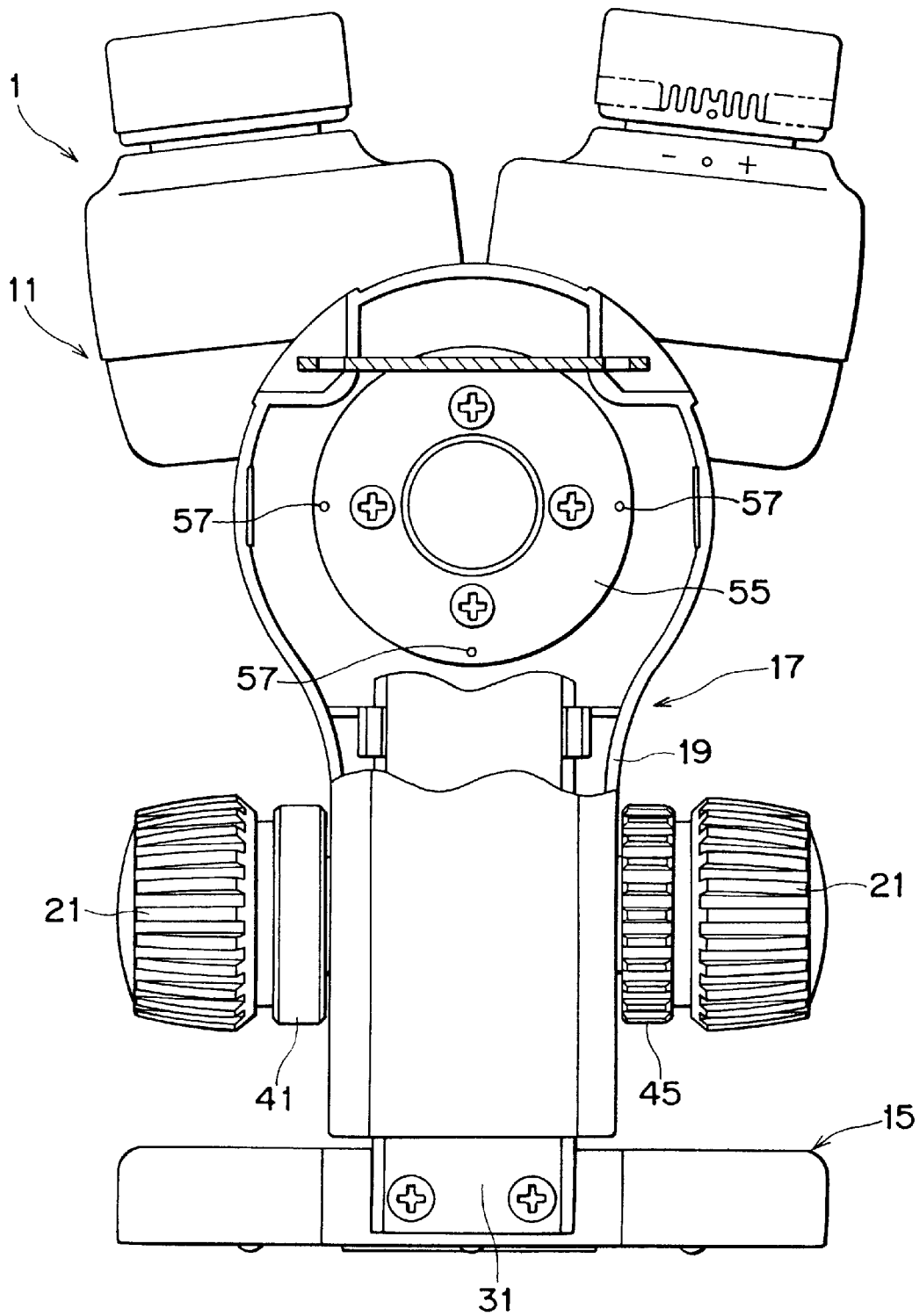
FIG. 3 is a rear sectional view of the main part of the same stereomicroscope.

The first embodiment of the present invention will be described below with reference to the drawings. FIG. 1 is a front view of a stereomicroscope in an observation state in accordance with the first embodiment of the present invention. FIG. 2 is a side sectional view of the main part of the stereomicroscope. FIG. 3 is a rear sectional view of the main part of the stereomicroscope. As shown in FIG. 1 through FIG. 3, a stereomicroscope 1 includes a microscope unit 11 having a pair of objective lens groups 3, a pair of eyepiece lens groups 5, a pair of first porro prisms 7 and a pair of second porro prisms 9, a base 15 which detachably mounts a plate 13 for placing an object to be inspected, and a focusing unit 17 which connects the microscope unit 11 to the base 15. In FIG. 1, symbols L1 and L2 show a left optical axis and a right optical axis, respectively.

Figure 4:
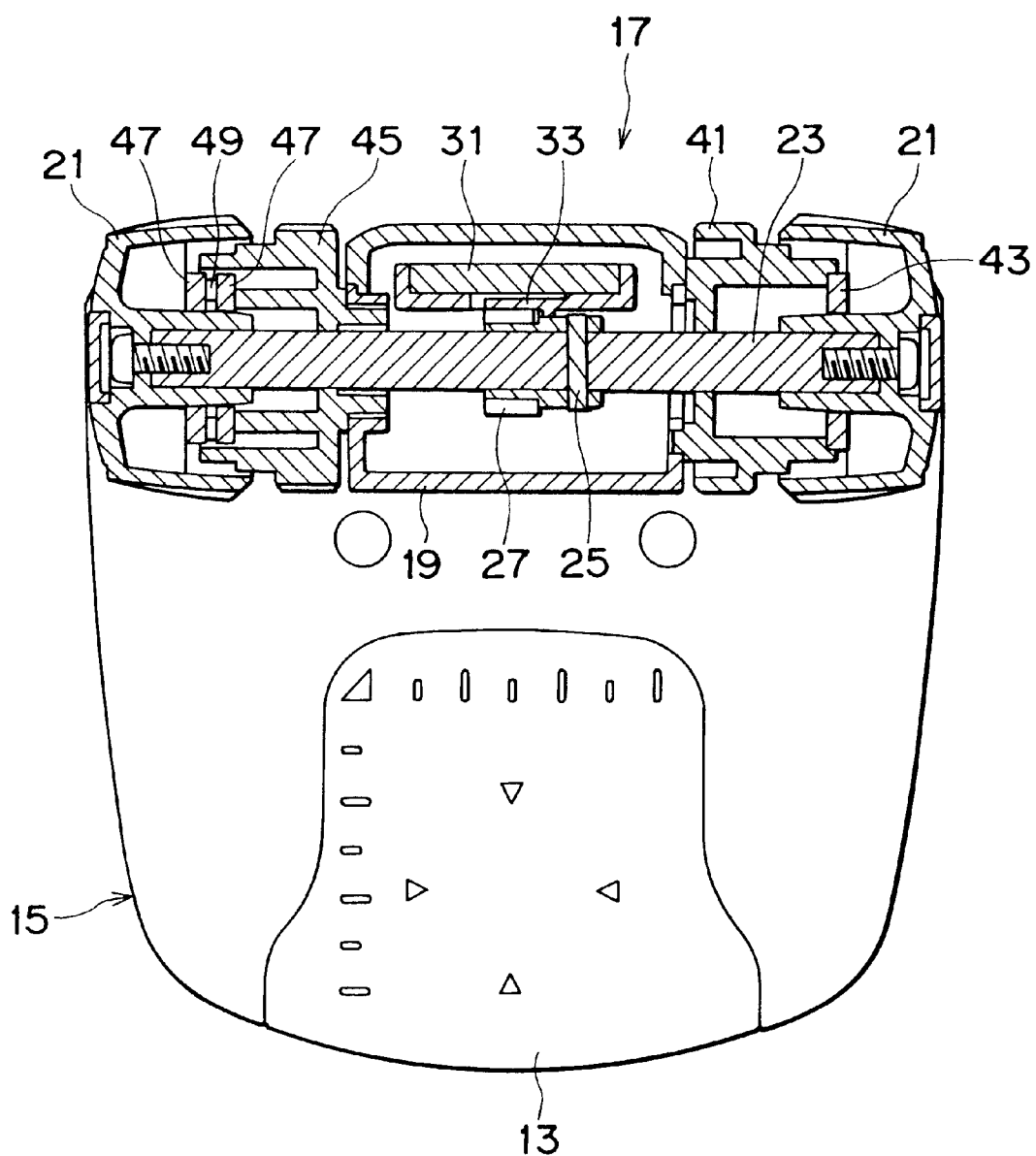
FIG. 4 is a cross-sectional view taken along 4—4 of FIG. 1.

A focusing body 19 of the focusing unit 17 is provided with a pair of focusing handles 21, i.e. a left and right focusing handles 21, above the base 15. As shown in FIG. 4 (a cross-sectional view taken along 4—4 in FIG. 1), the focusing handles 21 are secured to both ends of a focusing shaft 23 by screws, the focusing shaft 23 being supported rotatably to the focusing body 19. A pinion 27 is secured to the focusing shaft 23 by a pin 25 located approximately in the middle of the focusing shaft 23. The pinion 27 engages a rack 33 that is secured to the base 15 along with a back plate 31. When the user rotates the focusing handle 21, the pinion 27 receives a reaction force from the rack 33, thereby enabling the focusing body 19 to move up and down in a direction perpendicular to the base 15.

Spacer ring 41 and a plain washer 43 are interposed between the focusing body 19 and the right focusing handle 21. A focusing torque adjusting ring 45, a pair of plain washers 47 and a wave washer 49 that is interposed between plain washers 47, are interposed between the focusing body 19 and the left focusing handle 21. The spacer ring 41 and the focusing torque adjusting ring 45 are bearings for the focusing shaft 23. The focusing torque adjusting ring 45 is screwed into the side of the focusing body 19. The protruded height of the focusing torque adjusting ring 45 from the side surface of the focusing body 19 is varied by rotating the focusing torque adjusting ring 45. When the focusing torque adjusting ring 45 is completely screwed into the focusing body 19, a deflection of the wave washer 49, sandwiched between two plain washers 47, becomes very small, and, accordingly, an operating torque of the focusing handle 21 becomes small enough. But the operating torque of the focusing handle 21 is not so small as the microscope unit 11 and the focusing body 19 fall freely. The protruded height of the focusing torque adjusting ring 45 is adjusted by rotating the focusing torque adjusting ring 45, thereby the operating torque of the focusing handle 21 being able to be set at will.

A flanged support annular plate 53 and a rotary click ring 55 made of spring steel sheet are secured by screws to a microscope body 51 of the microscope unit 11. The microscope body 51 and the flanged support annular plate 53 are supported on the front face of the focusing body 19 rotatably around rotation axis R. The rotary click ring 55 has through holes 57 spaced apart every 90-degrees. By engaging each steel ball 59, which is retained by the focusing body 19, with the through hole 57, the microscope unit 11 is positioned every 90-degrees.

The microscope body 51 has an opening 61, which is closed by a sliding shutter 63, for objective lens group 3 on the lower side thereof. The sliding shutter 63 engages linear grooves 65 located on the left and right sides of the opening 61 and slides parallel to the rotation axis R. The linear grooves 65 have little protrusions 67 and 69 located at both ends of the stroke of the sliding shutter 63, and the sliding shutter 63 is stopped when running aground the protrusions 67 or 69.

When the user observes objects such as insects and minerals, he places the object on the plate 13 or pushes the object with the lower side of the base 15, rotating the focusing handle 21 of the focusing unit 17 adequately. Then, as described previously, the rotation of the focusing handle 21 moves the focusing body 19 (i.e. the microscope unit 11) up and down, and when optical axes L1 and L2 cross on the surface of the object, it is possible to observe the object.

Figure 5:
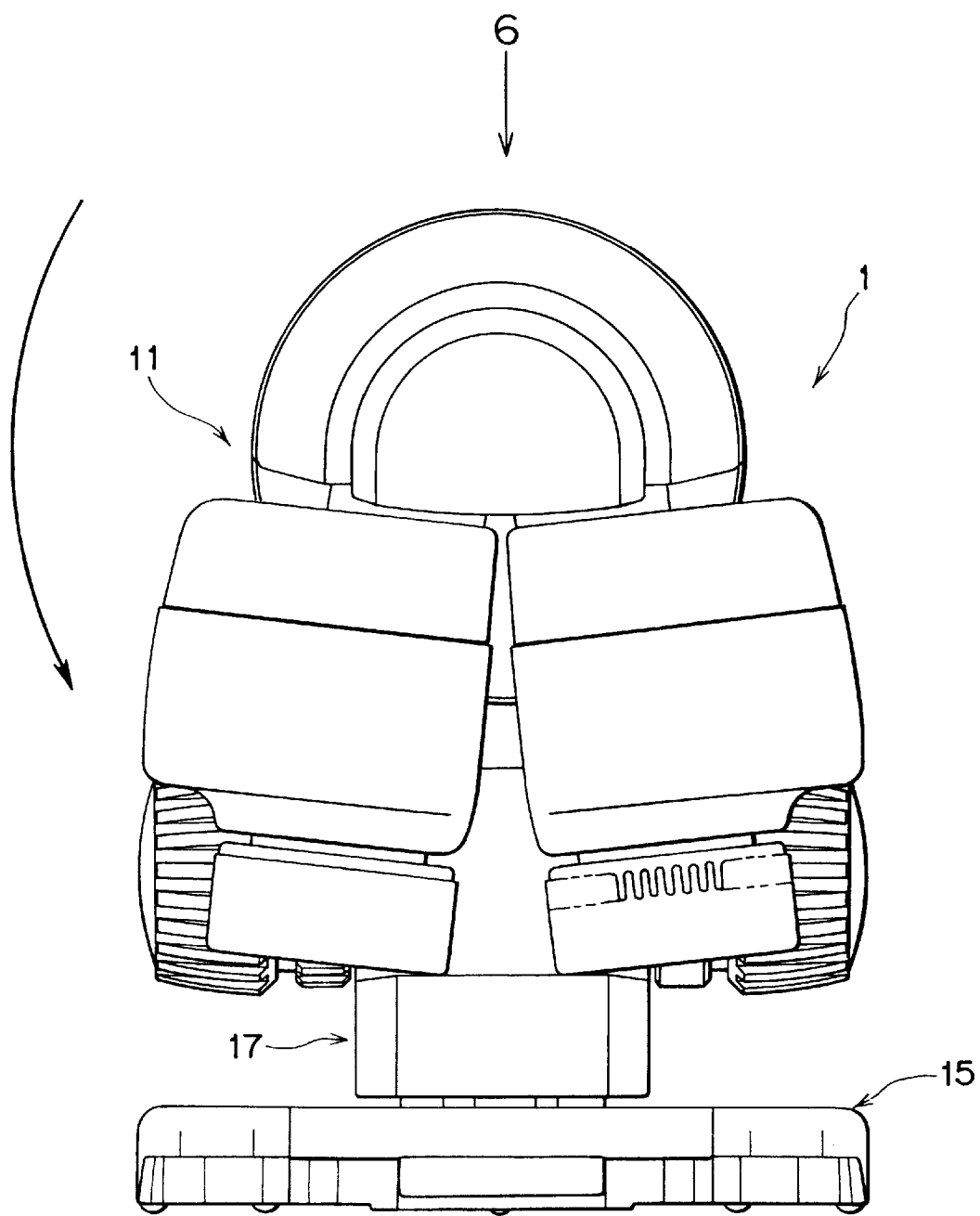
FIG. 5 is a front view of the stereomicroscope in a folded state in accordance with the first embodiment and the second embodiment.
Figure 6:
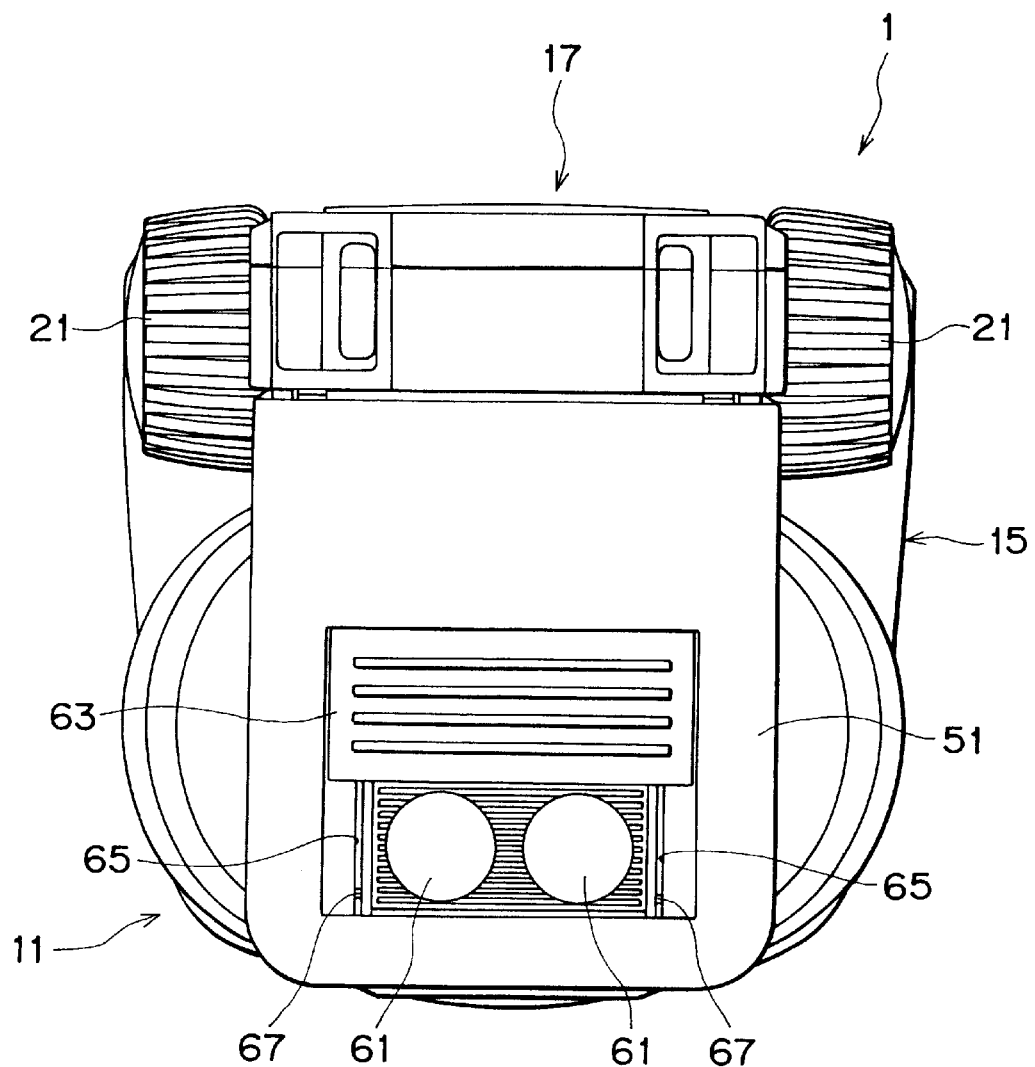
FIG. 6 is a view seen in the direction of arrow 6 shown in FIG. 5 in accordance with the first embodiment of the present invention.
Figure 7:
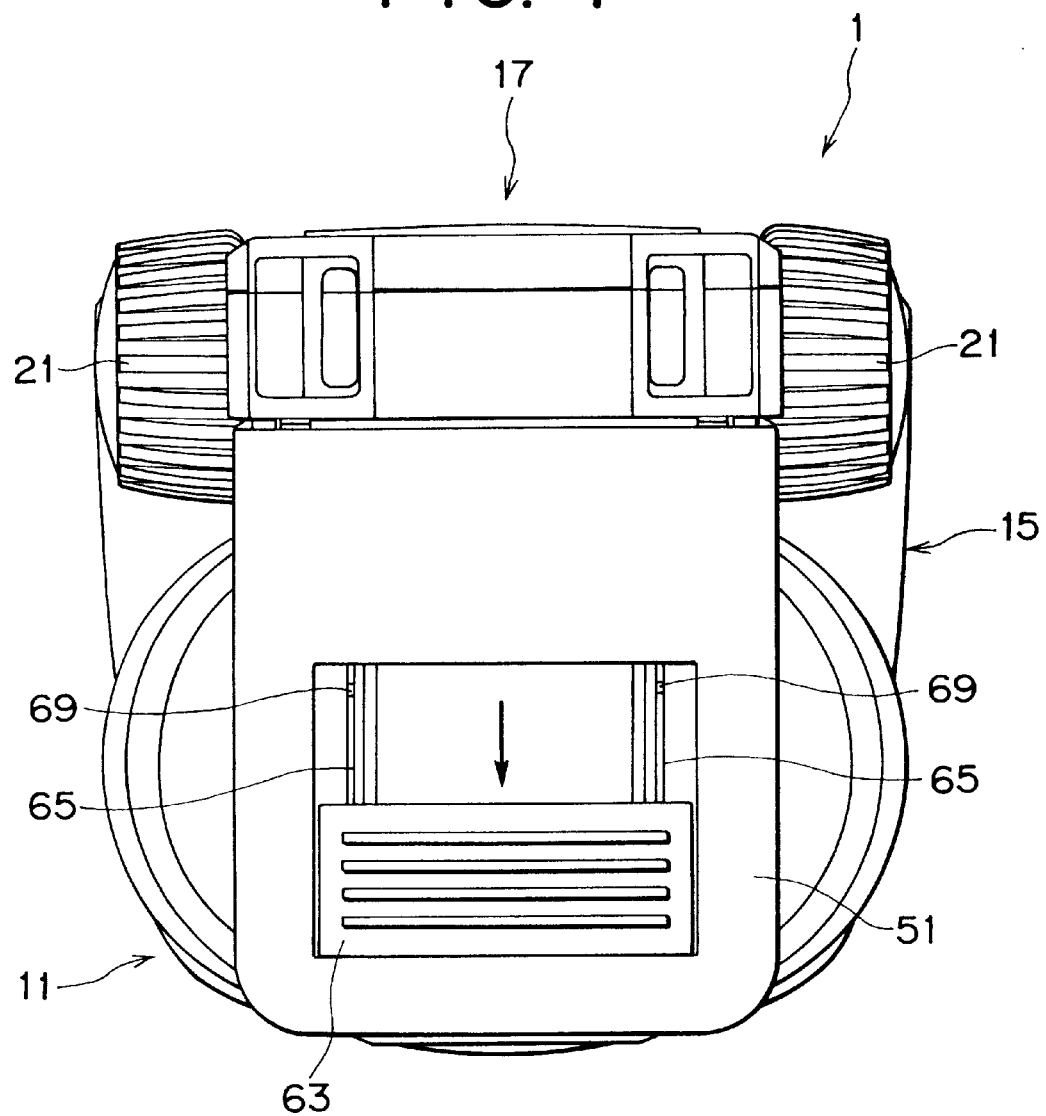
FIG. 7 is an explanatory view of a sliding shutter in a closed state in accordance with the first embodiment of the present invention.

When the user carries or keeps the stereomicroscope 1, he turns the microscope unit 11 upside down relative to the focusing unit 17, as shown in FIG. 5. However, dust or rain could enter the microscope body 51 through the opening 61 and cling to the surface of the eyepiece lens group 3, because the opening 61 is not closed as shown in FIG. 6 (a view seen in the direction of arrow 6 shown in FIG. 5). Then, the user slides the sliding shutter 63 toward the front of the microscope body 51 to close the opening 61, as shown in FIG. 7. When the sliding shutter 63 is closed, the microscope unit 11 does not rotate unintentionally because the sliding direction of the sliding shutter 63 is parallel to the rotation axis R. Furthermore, it is possible to avoid unintentional closing or opening of the sliding shutter 63 while carrying or keeping the stereomicroscope 1, because click action is performed by making the sliding shutter 63 run aground the protrusions 67 or 69 upon opening or closing of the sliding shutter 63.

THE SECOND EMBODIMENT

The second embodiment will be described below with reference to the drawings. The closing member manually closes the opening for the objective lens groups in the above-described first embodiment, but, in the second embodiment, the closing member electrically closes the opening, being driven by an electric motor. This is the difference between the first embodiment and the second embodiment.

The following description of the second embodiment will be concentrated in structures and functions different from the first embodiment, and the structures and functions same as those in the first embodiment will not be explained further.

Figure 8:
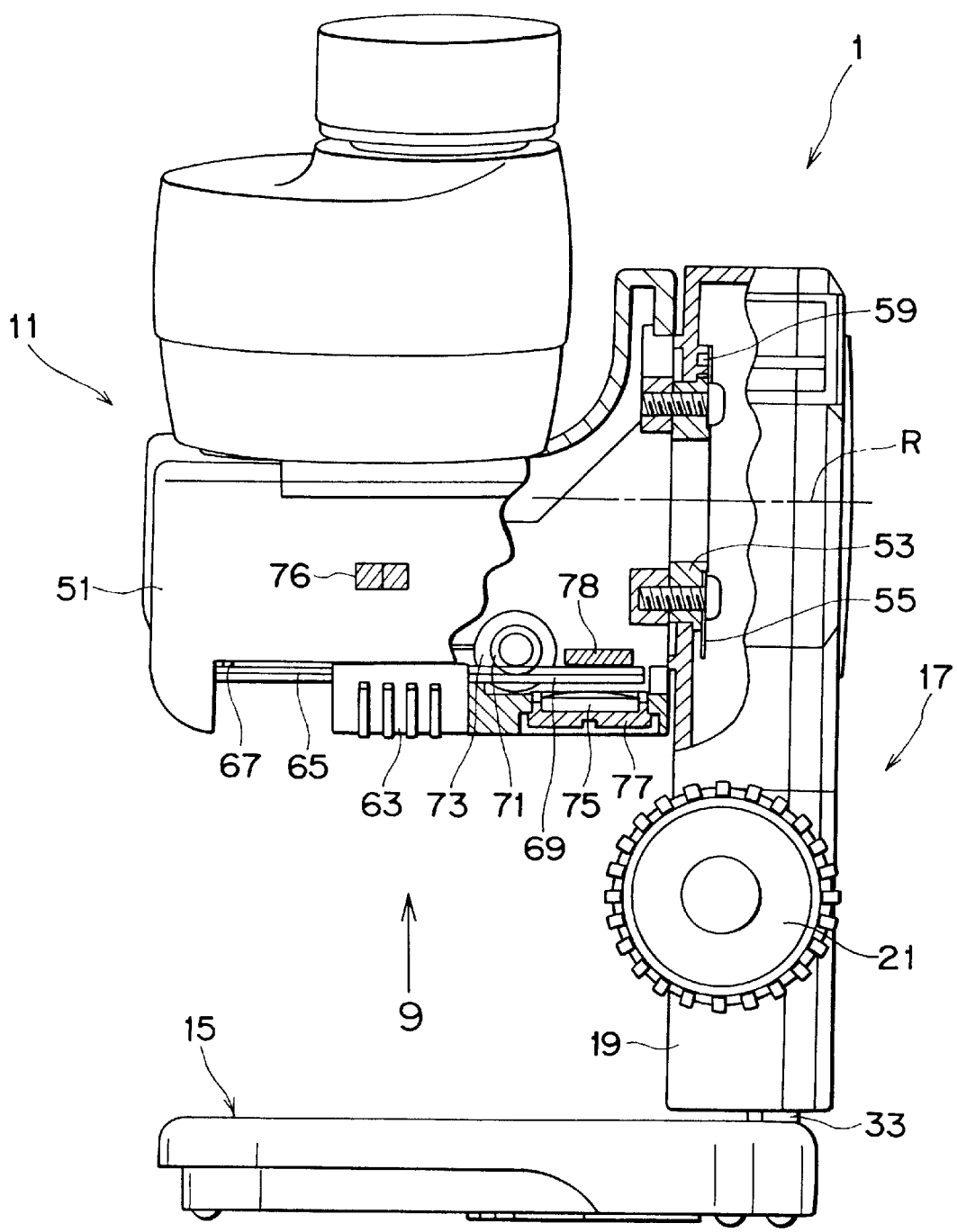
FIG. 8 is a side sectional view of the main part of the stereomicroscope in a state of observation in accordance with the second embodiment of the present invention.
Figure 9:
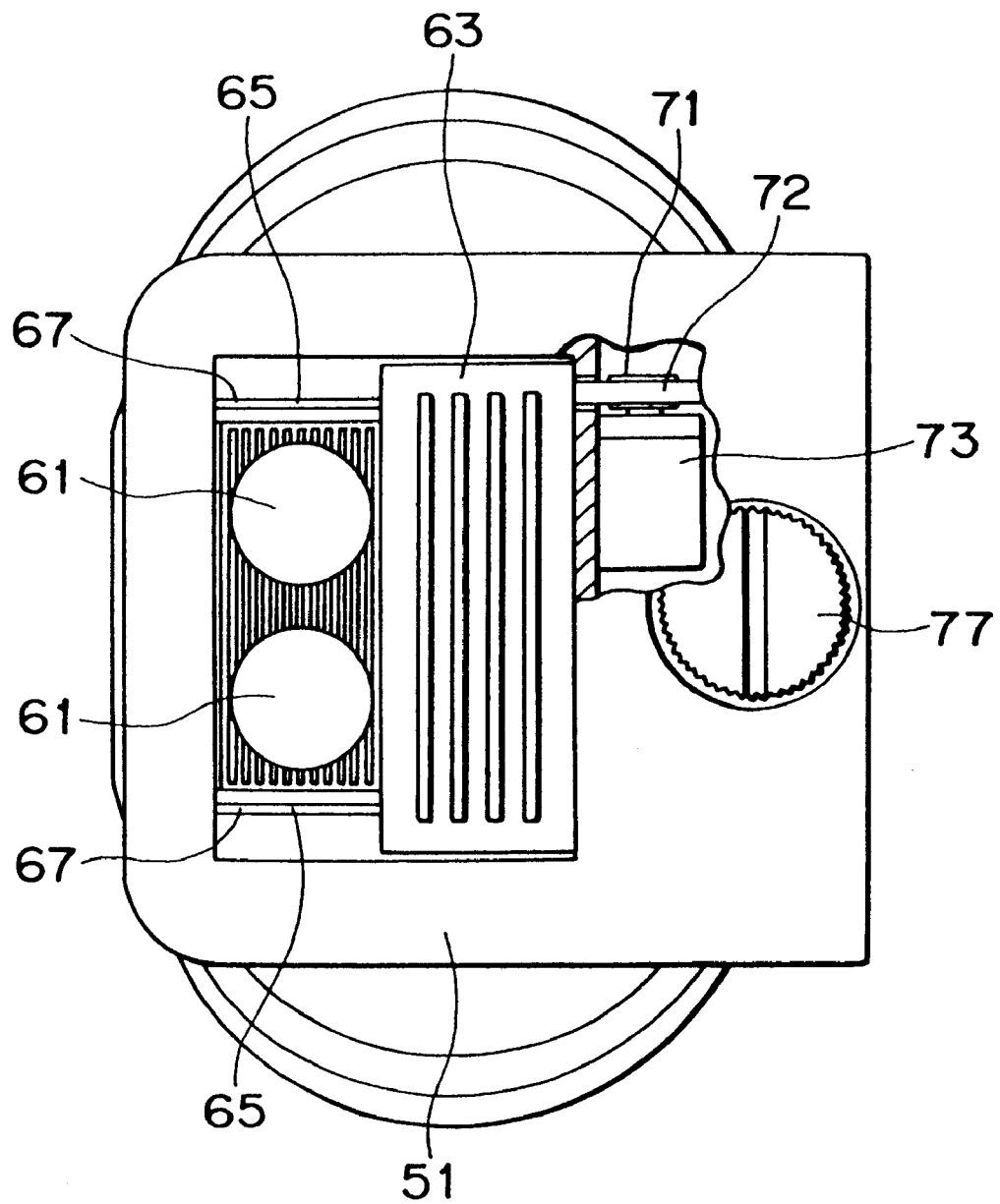
FIG. 9 is a view seen in the direction of an arrow 9 shown in FIG. 8.
Figure 10:
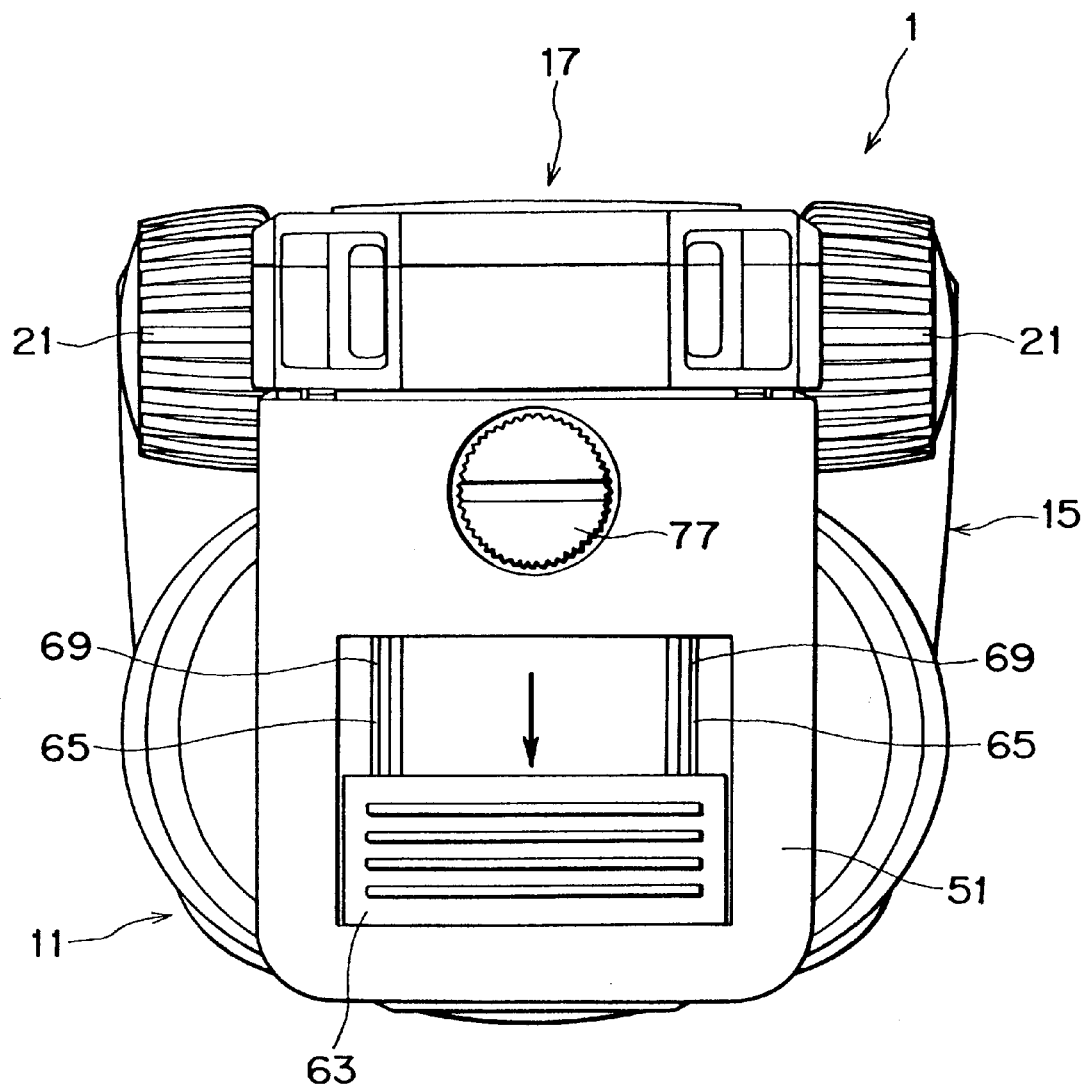
FIG. 10 is a view seen in the direction of an arrow 6 shown in FIG. 5 in accordance with the second embodiment of the present invention.

In the second embodiment, the microscope body 51 of the microscope unit 11 has the opening 61, which has the sliding shutter 63 to close the opening 61, for the objective lens group 3 on the lower side of the microscope body 51, as shown in FIG. 8 and FIG. 9 (a view seen in the direction of arrow 9 shown in FIG. 8). The linear grooves 65 have four protrusions 67 and 69, located at both ends of the stroke of the sliding shutter 63. The sliding shutter 63 is formed so as to incorporate with rack plate 72 behind the left side end thereof, and the rack plate 72 extends toward the focusing unit 17. In the microscope body 51, an electric motor 73 is connected to the rotating shaft of the pinion 71 that engages rack plate 72, and a button-type battery 75 powering the electric motor 73 is placed. The lid 77 is a screw-type lid that is for a button-type battery chamber.

Powering to the electric motor 73 is controlled by a switch 76 located on the side face of the microscope body 51, and by a control circuit board 78, located in the microscope body 51. If the user turns on the switch 76 manually to use the stereomicroscope 1, then a current is provided to the electric motor 73 so that the electric motor 73 rotates in a direction of opening the sliding shutter 63. If the user turns off the switch 76 after he uses the stereomicroscope 1 or when he puts the same into the protecting case, then a current is provided to the electric motor 73 so that the electric motor 73 rotates in a direction of closing the sliding shutter 63. The control circuit board 78 has a circuit that stops the motor, after detecting that the sliding shutter 63 moves to the limit of its stroke, or after detecting that torque loaded to the electric motor 73 increases rapidly Operation of the second embodiment will be described below. The common operation of observing objects such as insects and minerals in the second embodiment is the same as in the first embodiment.

When the user carries or keeps the stereomicroscope 1, he turns off the switch 76 manually. Thereafter, the button-type battery 75 provides a current to the electric motor 73 through the control circuit on the control circuit board 78, causing the pinion 71 to rotate so as to move the rack plate 72 (i.e. the sliding shutter 63) to the limit of the closing stroke. When the user manually turns on the switch 76 to use the stereomicroscope 1, the button-type battery 75 provides a current to the electric motor 73 through the control circuit on the control circuit board 78, causing the pinion 71 to rotate so that the sliding shutter 63 moves to the limit of the opening stroke. Furthermore, in place of the manual switch as described, it may be possible to place a switch which is interlocked or operatively associated with the upside down turning movement of the microscope unit 11.

In accordance with the embodiments of the present invention described herein, a microscope body has a closing member to close an opening for said objective lens groups. When a user carries or keeps a stereomicroscope, he turns a stereomicroscope upside down. By closing the opening with the closing member, he can prevent dust and rain from entering the microscope body and clinging to surfaces of the subjective lens groups.

Furthermore, in accordance with the embodiments of the present invention, the microscope body is provided with the closing member therewith so that there is no case where the user would lose the closing member. Furthermore, in accordance with the embodiments of the present invention, the microscope body uses a sliding shutter as the closing member so that it is very easy to open and close the opening.

Although the present invention has been described above with respect to two embodiments, the invention is not limited to these embodiments. For example, in the above embodiments, although the sliding shutter is used as a closing member, it is also possible to use a rotary shutter or a swing-type shutter instead of the sliding shutter. Furthermore, the construction of the stereomicroscope is not limited to the embodiments described above, but it is also possible to change the construction according to conditions such as design conditions.

What is claimed is:

1. A stereomicroscope comprising:
   a microscope unit having a microscope body that holds eyepiece lens groups and objective lens groups;
   a base that supports said microscope unit;
   a focusing unit that connects said microscope unit movably up and down to said base;
   wherein said microscope body is provided with a closing member to close an opening for said objective lens groups; and wherein said microscope body is rotatably supported on a face of said focusing unit such that the microscope body is rotatable about an axis extending substantially perpendicular to said face and said closing member being slidably mounted on said microscope for movement in a direction substantially parallel to said axis.

2. A stereomicroscope according to claim 1, wherein said closing member is a sliding shutter that is slidably held to said microscope body.

3. A stereomicroscope according to claim 2, further comprising:
   a drive device that opens and closes said closing member.

4. A stereomicroscope according to claim 3, wherein said drive device includes a motor actuated by a switch mounted on at least one of said microscope body and said focusing unit.

* * * * *